United States Patent Office 3,557,195
Patented Jan. 19, 1971

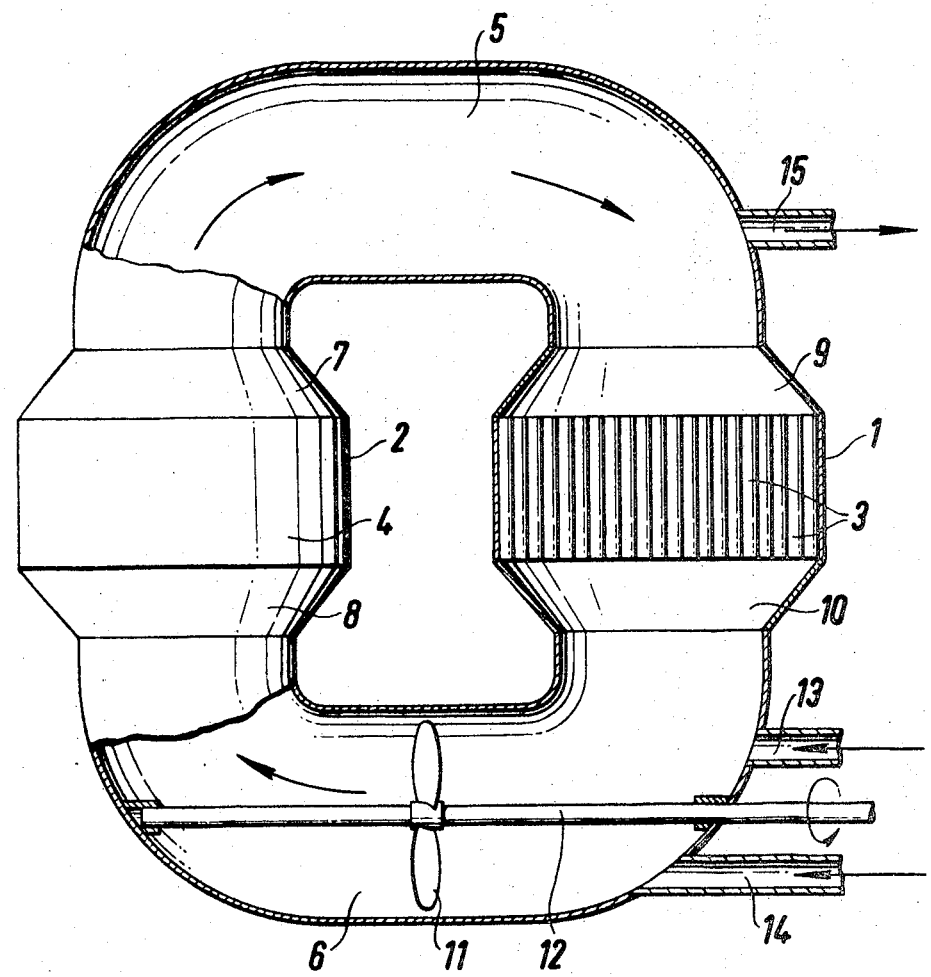

3,557,195
MANUFACTURE OF PERACETIC ACID
Michael James Haggar, Allestree, and Donald Arthur Sharman, Coventry, England, assignors to Courtaulds Limited, London, England, a British company
Filed Oct. 11, 1965, Ser. No. 494,431
Claims priority, application Great Britain, Aug. 24, 1965, 36,229/65
Int. Cl. C07c 73/12
U.S. Cl. 260—502                                    3 Claims

ABSTRACT OF THE DISCLOSURE

A process for the manufacture of peracetic acid by the vapor phase oxidation of aldehyde with oxygen which comprises establishing a circuitous stream of gases including oxygen, acetaldehyde reactant and acetaldehyde oxidation products, injecting molecular oxygen and acetaldehyde vapors into said stream, causing acetaldehyde and oxygen to react while moving in said stream to form peracetic acid while maintaining the average temperature of said stream at between about 120° and about 220° C.

---

This invention relates to the vapour phase reaction of acetaldehyde and molecular oxygen to produce peracetic acid and includes a reactor of novel design, for carrying out the reaction.

It has been proposed in U.S. patent specification No. 2,314,385 to react gaseous acetaldehyde with molecular oxygen in a molar ratio of about 7:3 respectively at temperature between 175° C. and 230° C. and for a period of about 0.2 second, to obtain peracetic acid. The reactor disclosed is tubular.

U.S. Pat. No. 3,192,256 describes a similar process in which acetaldehyde and molecular oxygen at a molar ratio of from 3:1 to 19:1 respectively are reacted, preferably at a temperature of from 140° C. to 180° C. The reactor for containing this reaction is generally cylindrical and has an inlet or inlets for the reactant gases, an outlet for releasing the partially reacted mixture containing peracetic acid, and temperature control means, for example an electric heater, to control the reaction temperature. A fan may be sited within the reactor to stir the reactant and product gases, so that, when the reactor is in use, the contained mixture has a uniform composition throughout: the issuing mixture therefore has the same chracteristic composition. The average residence time is preferably from 5 to 30 seconds and up to 95 percent of the oxygen may be consumed.

The reaction is very exothermic and only when it is conducted on a relatively small scale is it possible for the heat to be easily eliminated through the walls of the reactor at a rate which allows the reaction temperature to be controlled. In a commercial process, employing a large volume of reactants, the surface area/volume ratio is less satisfactory: removing the heat is therefore more difficult, but necessary if the process is to be safe to operate.

The classical design of the reactor—an essentially cylindrical chamber or tube—is incapable of embodying a sufficient area of heat exchanger surface to eliminate the heat when the oxygen conversion is high and the residence time is that required for the process, namely up to 30 seconds; longer periods cause a drop in the yield of peracetic acid, the product being consumed in reaction with acetaldehyde, thermal decomposition and other wasteful side reactions, whilst periods shorter than about 5 seconds do not allow an acceptable conversion of oxygen to peracetic acid.

The present invention is particularly concerned with commercial manufacture of peracetic acid and the safe operation of the highly exothermic and potentially explosive reaction of acetaldehyde and molecular oxygen on a substantial scale.

A process for the manufacture of peracetic acid from acetaldehyde and oxygen, comprises establishing a circuitous stream of gasses including oxygen, acetaldehyde and acetaldehyde oxidation products, continuously injecting molecular oxygen and acetaldehyde vopour in the presence of a gaseous diluent into said circuitous stream or endless path, allowing the acetaldehyde and oxygen to react therein forming peracetic acid, whilst circulating the gases around the path, whereby a gradient of oxygen content, falling downstream of the freshly injected oxygen, is established in the gases along the path, removing the heat of reaction to maintain the reaction temperature at between 120° C. and 220° C., preferably between 125° C. and 200° C., and removing a portion of the gases from the path downstream of the freshly injected oxygen.

It is necessary to decrease the rate of production of heat per unit volume from the value characteristic of the reaction of acetaldehyde and molecular oxygen in stoichiometric proportions to a value which allows a heat exchanger to eliminate the heat. This is best done by diluting the reactants. The main diluent is generally acetaldehyde itself, but other diluents e.g. permanent gases, or substances existing as vapours at the reaction temperature, for example the solvent employed in the recover of peracetic acid, may be used in place of or in addition to the acetaldehyde. The spent reaction mixture also acts as diluent by virtue of the back mixing inherent in circulating the gases around the endless path at the preferred rate of between 10 and 40 cycles per average residence time. Thus the circulating gases preferably contain sufficient diluent to diminish the maximum oxygen content of the well-mixed mixture to 3 percent and better still to about 1 percent or even less and the rapid recirculation rate improves the efficiency of heat transfer.

The total volume of the reactor and the rates of feed of the reactants are so related that the average residence time is between 5 and 30 seconds, and preferably between 8 and 15 seconds.

A reactor for containing the reaction embodies an endless passage, an inlet, or inlets, for admitting vaporous acetaldehyde and molecular oxygen in admixture, or severally, to the passage, a heat exchanger for controlling the reaction temperature, a fan within the passage for driving the gases unidirectionally around the passage, and an outlet, downstream of the inlet for admitting oxygen, for releasing a portion of the spent reaction mixture from the passage.

Preferably the outlet is situated as far as possible downstream of the oxygen inlet, so that the issuing gas has the minimum oxygen content when the apparatus is operating. Ideally, the apparatus has the outlet, the acetaldehyde inlet, the oxygen inlet and the fan, in that order, spaced in the streaming direction. The acetaldehyde injection therefore precedes the entry of oxygen into the stream, so that the oxygen is immediately diluted to the fullest extent with a considerable excess of acetaldehyde and the circulated reaction mixture, and these gases are well-mixed in passing directly through the fan.

The reactor surfaces in contact with the reaction mixture should not adversely affect the peracetic acid; aluminium already advocated as the structural material of containers for storing peracetic acid, and other peroxides, is a suitable material from which to construct the reactor.

A further advantage of the present process is that the risks of explosion in working up the mixture are considerably reduced. As much as 70 percent of the oxygen may be consumed in the reactor and, frequently, more than 90 percent. If, for any reason, the already low oxygen content of the issuing mixture requires to be diminished further, an inert gas, for example nitrogen, may be injected into the mixture after it has left the reactor.

The method of working up of the mixture involving the use of acetone or another volatile solvent having a boiling point between those of acetaldehyde and peracetic acid, has been described in our British patent specification No. 956,607. This method may be employed in conjunction with the process of the present invention; their joint application may then involve injecting acetaldehyde containing a considerable proportion of the inert solvent into the endless path of the reactor.

An embodiment of the reactor according to the present invention is illustrated in the accompanying drawing which shows a partly schematic, cross-sectional elevation of the reactor.

Referring to the drawing, the reactor, constructed largely of aluminium and having a volume of 80 cu. ft., incorporates two similar heat-exchangers 1 and 2, each heat exchanger having an internal exchanger surface of 125 sq. ft., derived from 280 tubes 3. Each tube has an external diameter of 1½ inches, a wall thickness of 0.104 inch and a length of 16 inches. The tubes are mounted in a cylindrical shell 4 having an internal diameter of 36 inches and containing two 75 percent shell-side baffles (not shown). The heat exchangers are joined, top and bottom, by ducts 5 and 6 (diameter 2 feet) through expansion pieces 7, 8, 9 and 10.

A fan 11 mounted coaxially in the duct 5, on a driving shaft 12 rotatable in gas-tight bearings in the wall of the duct. Inlets 13 and 14, for the admission of acetaldehyde and molecular oxygen, respectively, are sited immediately upstream of the fan and an outlet 15 from the duct 5 serves to release gas from the reactor.

In one experiment with this reactor, the fan was rotated to provide a recirculation rate of 45,700 lbs./hour or approximately 9,200 cubic feet/minute at 130° C.±0.5° C. and at atmospheric pressure. Oxygen was admitted to the reactor via the inlet 14 at the rate of 83 lbs./hour and 1760 lbs./hour of fresh acetaldehyde and recovered acetaldehyde containing acetone vapour and permanent gases were admitted through the inlet 13; the rate of feed in terms of acetaldehyde alone was 1630 lbs./hour. The average residence time of the gases in the reactor was 13.3 seconds, so that the recirculation rate was approximately 26 cycles per average residence time.

The heat of the reaction was of the order of 1500 CHU/pound of oxygen fed and additional heat was created by the compression due to the fan. The heat exchangers were, however, able to eliminate this heat and hold the specified temperature of 130° C.±0.5° C.

The gases issuing from the reactor contained peracetic acid, acetic acid, acetaldehyde, acetone and permanent gases, for example oxygen and carbon dioxide. The rate of separation of the acids from the column in which the spent reaction mixture was distilled, was found to be 126 lbs./hour of peracetic acid and 57 lbs./hour of acetic acid. The conversion of oxygen to acids was, therefore, 82 percent.

What we claim is:

1. A process for the manufacture of peracetic acid by the vapor phase oxidation of acetaldehyde with oxygen which comprises establishing a circuitous stream of gases including oxygen, acetaldehyde reactant, diluent, and acetaldehyde oxidation products, injecting molecular oxygen and acetaldehyde vapor into said stream, causing acetaldehyde and oxygen to react while moving in said stream to form peracetic acid, thus establishing a gradient of diminishing oxygen content in said stream downstream of the point of oxygen injection, removing heat of reaction by heat exchange means positioned in the circuitous stream thereby to maintain the average temperature of said stream at between about 120° C. and about 220° C., and removing gases from said stream downstream of the point of oxygen injection after an average residence time of between about 5 and about 30 seconds.

2. A process as claimed in claim 1 in which the residence time is between 8 and 15 seconds.

3. A process as claimed in claim 1 in which the reaction temperature is from 125° C. to 200° C.

References Cited
UNITED STATES PATENTS

| | | | |
|---|---|---|---|
| 2,232,674 | 2/1941 | Pyzel | 23—1 |
| 2,314,385 | 3/1943 | Bludworth | 260—502A |
| 3,192,256 | 6/1965 | MacLean et al. | 260—502A |

BERNARD HELFIN, Primary Examiner

W. B. LONE, Assistant Examiner